US007587761B2

United States Patent
Duffield et al.

(10) Patent No.: US 7,587,761 B2
(45) Date of Patent: Sep. 8, 2009

(54) ADAPTIVE DEFENSE AGAINST VARIOUS NETWORK ATTACKS

(75) Inventors: Nicholas Duffield, Summit, NJ (US); Weibo Gong, Amherst, MA (US); Don Towsley, Amherst, MA (US); Changchun Zou, Amherst, MA (US)

(73) Assignee: AT&T Corp., New York, NY (US)

( * ) Notice: Subject to any disclaimer, the term of this patent is extended or adjusted under 35 U.S.C. 154(b) by 784 days.

(21) Appl. No.: 11/216,972

(22) Filed: Aug. 31, 2005

(65) Prior Publication Data

US 2006/0282894 A1 Dec. 14, 2006

Related U.S. Application Data

(60) Provisional application No. 60/689,241, filed on Jun. 10, 2005.

(51) Int. Cl.
*G06F 11/00* (2006.01)
*G06F 15/16* (2006.01)
(52) U.S. Cl. .............................. 726/22; 726/23; 726/24; 726/25; 726/11
(58) Field of Classification Search ............. 726/11–14, 726/22–25; 713/150, 154, 160
See application file for complete search history.

(56) References Cited

U.S. PATENT DOCUMENTS

2006/0137009 A1* 6/2006 Chesla ........................ 726/22

OTHER PUBLICATIONS

Zou Cliff Changchun, et al: "Worm propagation modeling and analysis under dynamic quarantine defense" Worm Proc. ACM Workshop Rapid Malcode; Worm '03—Proceedings of the 2003 ACM Workshop on Rapid Mailcode; Worm '03—Proceedings of the 2003 ACM Workshop on Rapid Malcode 2003 [online] 2003, pp. 51-60.
Thottethodi M, et al: "Self-tuned congestion control for multiprocessor networks" Proceedings on HPCA Seventh Intenrational Sysmposium on High-Performance Computer Architecture IEEE Comput. Soc Los Alamitos, CA, USA, 2001, pp. 107-118.
F. Ertemalp, D. R. Cheriton, and A. Bechtolsheim: "Using dynamic buffer limiting to protect against belligerent flows in high-speed networks" Int'l Conf. on Network Protocols (ICNP), [Online] Nov. 11, 2001, pp. 230-240.
Zou Cliff Changchun, et al: "Adaptive Defense Against Various Network Attacks". Steps to Reducing Unwanted Traffic on Internet Workshop—SRUTI '05, [Online] Jul. 7, 2005.

* cited by examiner

*Primary Examiner*—Hosuk Song
(74) *Attorney, Agent, or Firm*—Fay Kaplun & Marcin, LLP

(57) ABSTRACT

An apparatus for optimizing a filter based on detected attacks on a data network includes an estimation means and an optimization means. The estimation means operates when a detector detects an attack and the detector transmits an inaccurate attack severity. The estimation means determines an accurate attack severity. The optimization means adjusts a parameter and the parameter is an input to a filter.

18 Claims, 2 Drawing Sheets

ADAPTIVE DEFENSE AGAINST VARIOUS NETWORK ATTACKS

CROSS REFERENCE TO RELATED APPLICATIONS

The present application claims priority to U.S. Provisional Patent Application Ser. No. 60/689,241 filed on Jun. 10, 2005.

FIELD

The present embodiments relate generally to the automatic adjustment of the sensitivity in network attack detection systems under dynamic traffic conditions.

BACKGROUND

In a Denial-of-Service (DoS) attack, an attacker bombards a victim network or server with a large volume of traffic. The traffic overload consumes the victim's available bandwidth, CPU capacity, or other critical system resources, and eventually brings the network or server to a situation in which it is unable to serve its legitimate clients. Distributed DoS (DDOS) attacks can be even more damaging, as they involve creating artificial network traffic from multiple sources simultaneously. In a "conventional" massive-bandwidth attack, the source of the attack may be traced with the help of statistical analysis of the source Internet Protocol (IP) addresses of incoming packets. The victim can subsequently filter out any traffic originating from the suspect IP addresses, and can use the evidence to take legal action against the attacker. Many attacks, however, now use "spoofed" IP packets—packets containing a bogus IP source address—making it more difficult for the victim network to defend itself against attack.

Even with the recent improvement of attack detection systems, a need exists for a system that will perfectly classify network traffic. The attack detection systems all eject good traffic (false positives), or accept bad traffic (false negatives). The algorithms share the common problem: how to adjust the "sensitivity" of the algorithm in order to strike the right balance between the twin evils of rejecting good traffic and accepting bad traffic. The embodiments of the invention provide a solution to this problem. The approach involves attributing a cost to bad identification of traffic, then minimizing the overall cost. There is a need for a detection system that automatically adjust sensitivity at short time scales, rather than requiring operator intervention, which requires longer time scales.

The present embodiments meet these needs.

SUMMARY

An embodiment can be an apparatus for optimizing a filter based on detected attacks on a data network. The apparatus can include an estimation means and an optimization means. The estimation means can operate when a detector detects an attack and the detector transmits an inaccurate attack severity. The estimation means determines an accurate attack severity. The optimization means adjusts one or more parameters. The parameters are an input to a filter.

In an embodiment, the apparatus can be for optimizing a filter based on detected attacks on a data network comprising, a data interface, a processor, a filter, an estimation means, and an optimization means. The processor can be connected to the data interface in order to receive packets. The packets can comprise one or more parameters.

The filter can comprise a blocking means and a detector. The blocking means prevents attack packets from entering the data network. The packets are blocked based on a parameter. The detector can detect attack packets.

The estimation means can operate when the detector detects an attack and the attack severity transmitted from the detector is not accurate. The estimation means determines an accurate attack severity. The optimization means can adjust the parameter, and the parameter can be an input to the filter.

BRIEF DESCRIPTION OF THE DRAWINGS

The detailed description will be better understood in conjunction with the accompanying drawings as follows.

Figure 1:
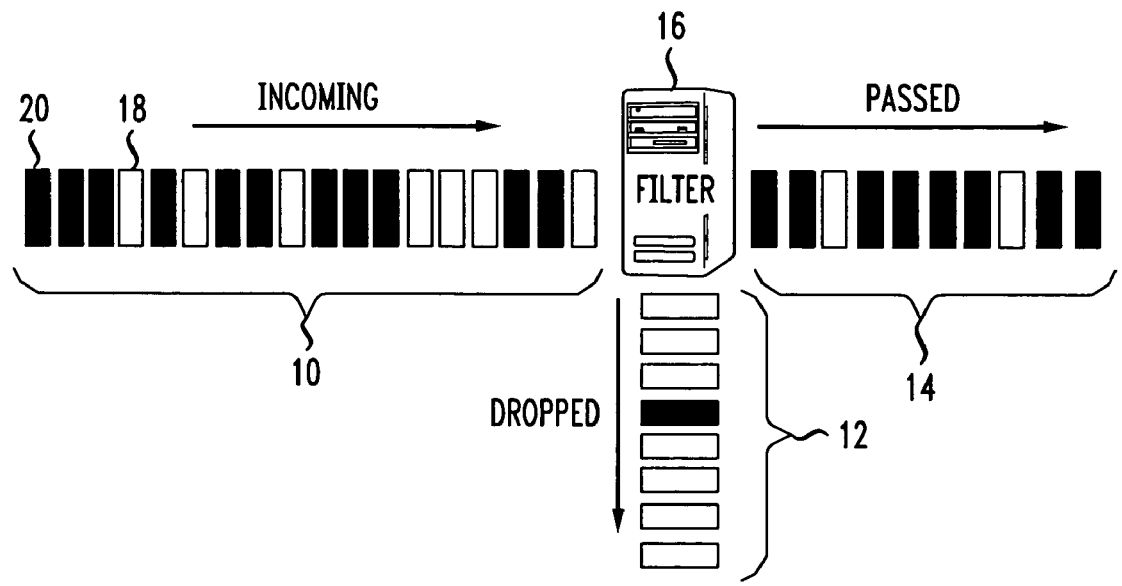
FIG. 1 depicts an embodiment of an operation of a filter.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that they can be practiced or carried out in various ways.

The present embodiments relate generally to automatically adjusting the sensitivity of network attack detection systems under dynamic traffic conditions.

The embodiments save costs to network providers by preventing a greater percentage of attack packets during a severe attack and allowing more normal packets during light attacks. The costs can be in terms of network outages, required network upgrades, or unauthorized access to a data network.

The embodiments can be for an apparatus for optimizing a filter. The optimization can be based on detected attacks on a data network. The apparatus can comprise an estimation means and an optimization means. The estimation means can operate when a detector detects an attack and when the attack severity transmitted from the detector is not accurate. The estimation means determines an accurate attack severity when the attack severity transmitted from the detector is not accurate. The adaptive defense apparatus can be applicable for various network attacks, including DoS attack, virus or worm infection, e-mail spamming, and the like. An example of a filter that can be used in accordance with these embodiments is a "Hop-Count Filter" (HCF) presented by Chen Jin, Haining Wang, and Kang G. Shin in a paper, entitled "Hop-Count Filtering: An Effective Defense Against Spoofed DDoS Traffic," published in Proceedings of the 10th ACM conference on Computer and Communications Security.

The estimation means can update the parameters continuously, or the estimation means can update the parameters only when there is a change required of the settings of the filter.

The optimization means is determined from a cost function. The cost function relates to an action that would be taken based upon false negatives and false positives. The cost can be in terms of a monetary amount, for example if the service provider must provide a service continuously. Also, if the server goes offline or if the services provided fall below a preset limit as a result of a DDoS attack, the service provider must pay a penalty; and so, the service provider has a direct monetary interest in filtering DDoS attacks accurately. An example of a preset limit can be that the service provider must provide no less than ninety percent of the incoming normal user's service requests.

The detector ascertains attack packets, the attack information might not be accurate do to false positives and false negatives. For example, a detector might detect that 50% of the packets are attack packets and 50% are normal packets. The estimation means takes this information from the detector and applies a computation to the data from the detector to create a more accurate representation of the percentage of attack packets. The estimation means bases an estimation on a formula specific to the type of attack the detector detects, the estimation can result in a larger or smaller percentage of attack packets than were ascertained by the detector.

The attack severity can be measured by a percentage of attack data versus normal data.

The packet can be an octet, an Internet Protocol (IP) packet, a frame relay packet, an Asynchronous Transfer Mode (ATM) cell or combination thereof.

The optimization means can adjust a parameter, and the parameter is an input to a filter. The filter uses the parameter to adjust the sensitivity. If the parameter shows there is an attack occurring, the filter becomes more sensitive and blocks more attack packets. If the detector shows that an attack is not occurring, the filter becomes less sensitive and allows more normal packets.

The parameter can be a threshold in terms of a number of packets. The parameter can also be a number of packets per a given time. The term "parameter" can have different meanings for different detectors. For example, in the Hop-Count Filtering for the SYN flood DDoS attack, the parameter is the abnormal tolerance value. When the observed hop-length of an incoming SYN packet differs from the true value and is larger than the threshold, the SYN packet is determined as an attack packet. The term "SYN" refers to a type of packet used by the Transmission Control Protocol (TCP) when initiating a new connection to synchronize the sequence numbers on the two connecting computers.

The more sensitive the detector is set, then the more likely the detector will detect attack packets. However as the detector's sensitivity is increased, the detector is more likely to detect false positives. The embodiments of this invention optimize sensitivity of the detector based upon data from the detector. Adjusting the sensitivity of the detector gives a lower overall cost to a data network by preventing more attack packets when there is an attack and allowing more normal packets when there is not an attack.

The parameter can be stored in the optimization means. When the parameter is stored in the optimization means, the optimization means compares the new calculated parameter to the one stored. If the new parameter is deferent than the parameter stored, then the new parameter can be sent to the filter to adjust the filter's attack sensitivity. For example, if the parameter from the estimation means or the detector never changes, the optimization means has no reason to send a new parameter to the filter.

In an alternative embodiment the parameter can be updated each time an estimation is output from the estimation means.

A filter can comprise a detector and a packet blocking means. The filter can determine the false negative $P_n$ and a false positive $P_p$ to make an adjustable parameter δ. The estimation means can determine the attack severity using the parameter setting of the filter. The filter black lists the IP address of the detected host, or the defense system relies on worm containment. Worm containment means to quarantine infected computers quickly to block the infection traffic from infecting other vulnerable computers.

The blocking means can block a packet based on a characteristic. The characteristic can be a packet header, packet body, multiple packet bodies, multiple packet headers or combinations thereof.

The detector can passively scan packets for attack characteristics. The detector can use the parameters directly or can use a third party device to interpret the parameters for input into the estimation means. A detector can be a standalone device or incorporated into a router's software. The estimation and optimization means, can be a standalone device, incorporated into a detector or incorporated into a router's software. The router's software can be extended to be a router's or a general computer's software.

The attacks can comprise SYN flood distributed denial of service attacks (DDoS), internet worm infection, distributed denial of service attacks without source spoofing, port scanning, email virus, and spam email attack, combinations thereof and other types of network attacks. E-mail viruses can be detected by the content of the email and DDoS can be detected by the packets.

The apparatus can further comprise a buffer aware function. The buffer aware function optimizes the maximum number of normal requests a server is capable of accepting based on the quantity of connections or specific performance connections. The buffer in a server on a data network can fill up with attack packets and will no longer be able to accept normal packets. The buffer can be located after the filter. If the buffer fills up with attack packets, the estimation means must adjust the filter to prevent more attack packets.

The buffer can have a size [K] wherein the B is the buffer size requirement. The parameter of the filter is adjusted when B<K because the filter is blocking too many packets, and when B>K because the filter is not blocking enough packets. Minimizing the following formula can result in the correct parameter to adjust the filter:

$$f = \min_{\delta(k+1)} |B - K|$$

In an alternative embodiment for the apparatus for optimizing a filter based on detected attacks on a data network, the apparatus comprises a data interface, a processor, and a processor connected to the data interface in order to receive packets, wherein the packets comprise a parameter, a filter, an estimation means and an optimization means.

The filter can comprise a blocking means and a detector. The blocking means can prevent attack packets from entering the data network. The packets can be blocked based on a parameter, and the detector can detect the attack packets.

The estimation means can operate when the detector detects an attack, and the attack severity transmitted from the detector is not accurate. The estimation means determines an accurate attack severity.

The optimization means can adjust the parameter, and the parameter can be an input to the filter.

With reference to the figures, FIG. 1 depicts the operation of a filter 16. The filter 16 includes incoming data 10, dropped data 12, and passed data 14. The incoming data 10 comprises both normal 20 and attack packets 18. The dropped data 12 is data that is determined by the filter to be attack packets; however false positives in the form of normal packets 20 can be included in the dropped data. The passed data 14 can include only normal packets 20; however false negatives can appear in the form of attack packets 18.

The attack severity is in terms of a variable [$\pi$]. The variable [$\pi'$] represents the fraction of detected attack traffic and can be in terms of the dropped data [m] divided by the incoming traffic [n]. In rewritten form m=$\pi'$·n. The optimization of the formula results in m=$(1-P_n)\cdot\pi\cdot n + P_p\cdot(1-\pi)\cdot n$, wherein $P_p$ is the false positive probability of blocking normal traffic, and $P_n$ is the false negative probability of missing attack traffic.

Figure 2:
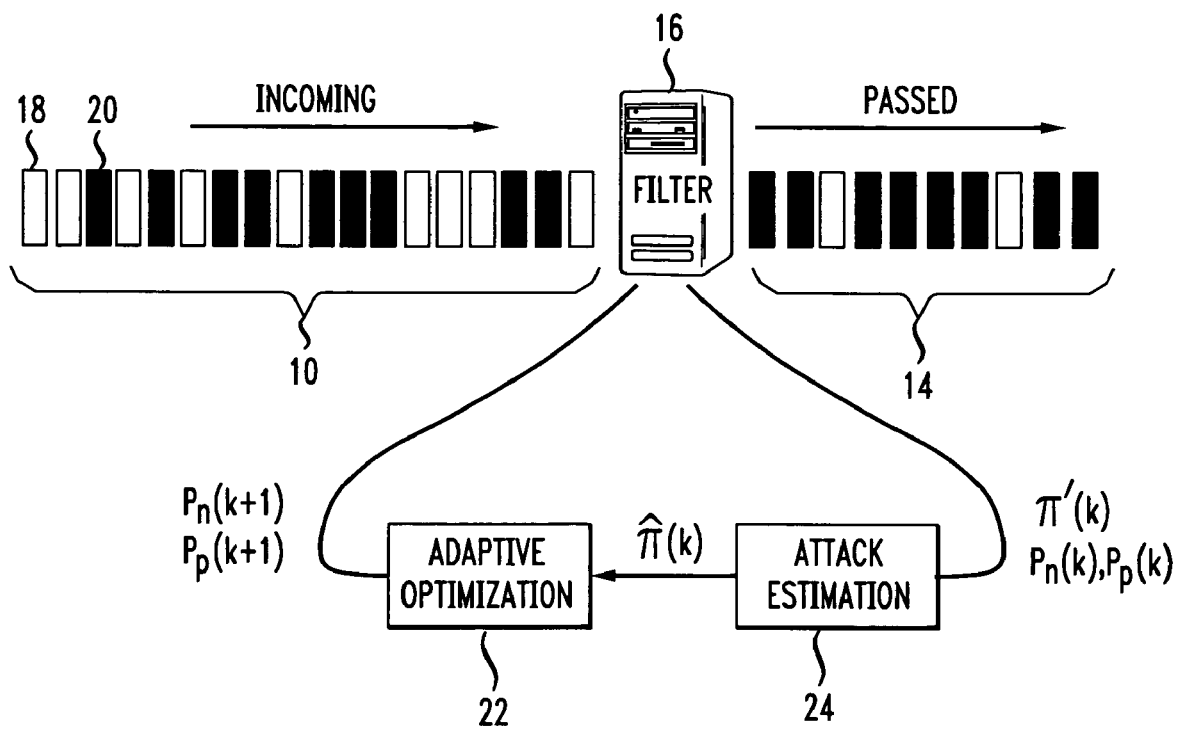
FIG. 2 depicts an embodiment of an adaptive optimization means.

FIG. 2 depicts the adaptive optimization means 22, and the attack estimation means 24 in communication with the filter 16. The filter 16, receives incoming data 10, comprising attack packets 18 and normal packets 20. The estimation means 24 and the optimization means 22 can be used to adjust the filter 16 to minimize the cost of dropping normal traffic $c_p$ and to minimize the cost of transmitting attack traffic $c_n$. As a time interval passes from k to k+1, the estimation means 24 receives $P_n(k)$, $P_p(k)$ and $\pi'(k)$. The estimation means 24 determines $\hat{\pi}(k)$. The variable $\hat{\pi}(k)$ can be represented as, $$\hat{\pi}(k) = \frac{\pi'(k) - P_p(k)}{1 - P_n(k) - P_p(k)}$$

The statistical property of the estimate of attack severity is $E[\hat{\pi}]=\pi$. The parameter can change even if the actual value of $\pi$ does not change because the changing of the parameter is based on the changing of $\hat{\pi}$ over time.

The optimization means 22 receives $\hat{\pi}(k)$, which is optimized and an output is created $P_n(k+1)$ and $P_p(k+1)$. The optimization formula is $$\min_{P_n, P_p} \{c_p[1-\hat{\pi}(k)]P_p + c_n\hat{\pi}(k)P_n\}.$$

Figure 3:
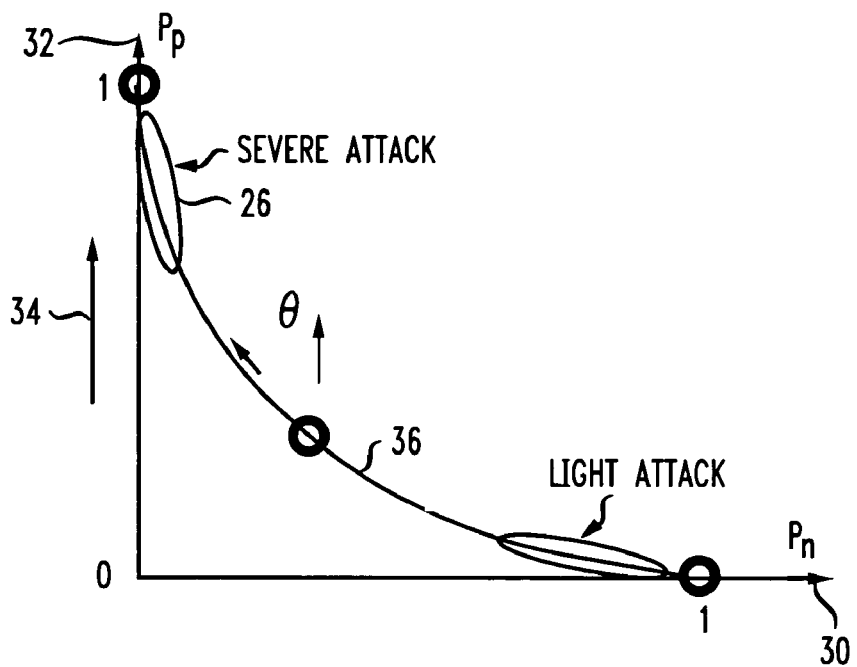
FIG. 3 depicts a graph representing the optimal operation points.

FIG. 3 depicts a graph representing the optimal operation points. As the detection sensitivity 36 increases in the direction 34, the number of false positives 32 [$P_p$] increases while the number of false negatives 30 [$P_n$] decreases. The adaptive defense system can adjust the detection sensitivity to any point on the graph. All points on the graph can be optimal points depending on the attack severity at a given time interval. If a severe attack 26 occurs, a higher detection sensitivity 36 blocking a few normal packets can be used; and if a light attack 28 occurs, a lower detection sensitivity 36 allowing a few attack packets can be used.

Figure 4:
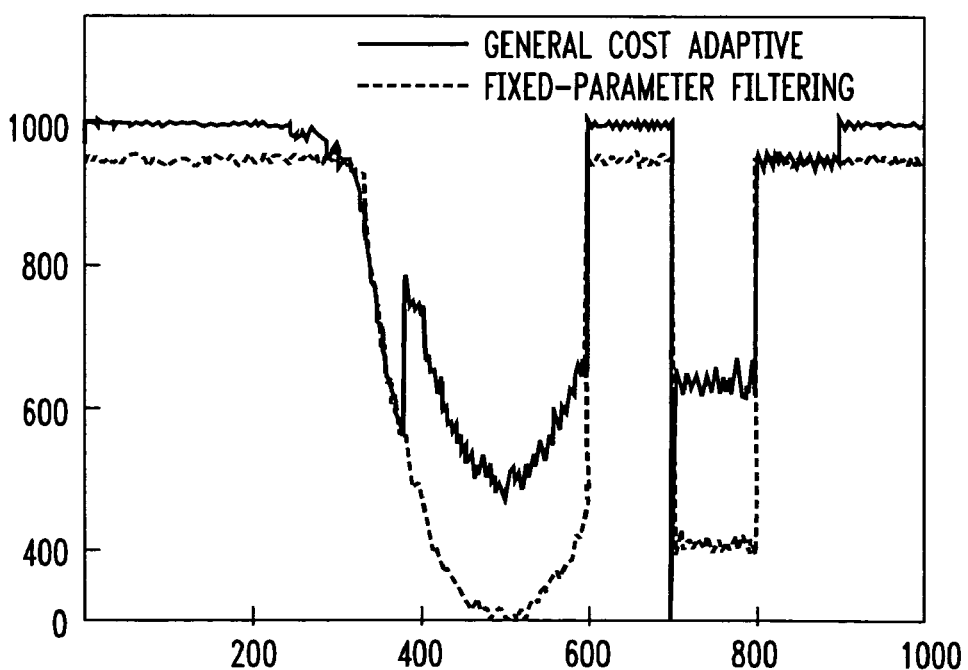
FIG. 4 depicts a graph representing the number of normal packets allowed to pass to a data network over a time [k].

FIG. 4 depicts a graph representing the number of normal packets allowed to pass to a data network over a time [k]. As shown by the graph, the adaptive filtering allowed more normal packets to be passed through the filter than the fixed-parameter filtering allowed. As shown in FIG. 4, the adaptive defense system achieves better performance than a fixed parameter defense system, such as with little attacks (for example, from time 0 to time 300) or severe attacks (for example, from time 400 to 600). The experiments that created the results in FIG. 4 were conducted on filters with a 24 bit, 28 bit, or a binary aggregation tree architecture.

While these embodiments have been described with emphasis on the embodiments, it should be understood that within the scope of the appended claims, the embodiments might be practiced other than as specifically described herein.

What is claimed is:

1. An apparatus for optimizing a filter based on detected attacks on a data network comprising:
   a. an estimation means, wherein the estimation means operates when a detector detects an attack and the detector transmits an inaccurate attack severity, and wherein the estimation means determines an accurate attack severity;
   b. an optimization means, wherein the optimization means adjusts a parameter, and wherein the parameter is an input to a filter; wherein the filter comprises a detector and a packet blocking means; and
   c. a buffer aware function, wherein the buffer aware function optimizes the maximum number of normal requests a server is capable of accepting based on the quantity of connections or specific performance connections.

2. The apparatus of claim 1, wherein the estimation means is an attack severity monitor.

3. The apparatus of claim 1, wherein the estimation means determines the attack severity using the parameter setting of the filter.

4. The apparatus of claim 1, wherein the estimation means updates the parameters continuously.

5. The apparatus of claim 1, wherein the estimation means is determined from a cost function.

6. The apparatus of claim 5, wherein the cost function relates to an action that would be taken based upon false negatives and false positives.

7. The apparatus of claim 1, wherein the detector passively scans packets for attack characteristics.

8. The apparatus of claim 1, wherein the accurate attack severity is measured by a percentage of attack data versus normal data.

9. The apparatus of claim 1, wherein the parameter is a threshold in terms of a number of packets.

10. The apparatus of claim 1, wherein the parameter is a number of packets per a given time.

11. The apparatus of claim 1, wherein the parameter is stored in the optimization means.

12. The apparatus of claim 1, wherein the parameter is updated each time an estimation is output from the estimation means.

13. The apparatus of claim 1, wherein the packet blocking means is adapted to block a packet based on a characteristic.

14. The apparatus of claim 13, wherein the characteristics are SYN flood distributed denial of service attacks, internet worm infections, distributed denial of service attacks without source spoofing, port scanning, email virus, spam email attack, or combinations thereof.

15. The apparatus of claim 1, wherein the filter determines a false negative Pn and a false positive Pp to make an adjustable parameter $\delta$.

16. The apparatus of claim 15, wherein the filter quarantines the IP address of the detected host, or the defense system relies on worm containment.

17. The apparatus of claim 1, wherein the packet is selected from the group consisting of: an octet, an Internet Protocol (IP) packet, a frame relay packet, an Asynchronous Transfer Mode (ATM) cell and combinations thereof.

18. An apparatus for optimizing a filter based on detected attacks on a data network comprising:
   a. a data interface;
   b. a processor connected to the data interface in order to receive packets, wherein the packets comprise a parameter;
   c. a filter, wherein the filter comprises:
      i. a blocking means, wherein the blocking means prevents an attack packet from entering the data network, and wherein the packets are blocked based on a parameter; and
      ii. a detector to detect attack packets;

d. an estimation means, wherein the estimation means determines an accurate attack severity, and wherein the estimation means operates when the detector detects the attack packet and the attack severity transmitted from the detector is not accurate, and;

e. an optimization means, wherein the optimization means adjusts the parameter, and the parameter is an input to the filter.

* * * * *